(12) United States Patent
Wang et al.

(10) Patent No.: US 7,888,882 B2
(45) Date of Patent: Feb. 15, 2011

(54) LED LAMP AND DRIVING APPARATUS FOR THE SAME

(75) Inventors: Chien-Lung Wang, Chupei (TW); Ching-Hsien Lin, Chupei (TW)

(73) Assignee: Alliance Optotek Co., Ltd., Hsinchu (TW)

( * ) Notice: Subject to any disclaimer, the term of this patent is extended or adjusted under 35 U.S.C. 154(b) by 544 days.

(21) Appl. No.: 12/022,181

(22) Filed: Jan. 30, 2008

(65) Prior Publication Data

US 2009/0189534 A1 Jul. 30, 2009

(51) Int. Cl.
*G05F 1/00* (2006.01)

(52) U.S. Cl. .................... 315/291; 315/224; 315/247; 315/312; 363/37; 363/131; 362/545; 362/549

(58) Field of Classification Search ............ 315/209 R, 315/247, 224, 307, 312, 291, 156; 363/24, 363/37, 41, 131–133; 362/296.01, 543–545, 362/549, 800
See application file for complete search history.

(56) References Cited

U.S. PATENT DOCUMENTS

| | | | | |
|---|---|---|---|---|
| 3,511,982 A | * | 5/1970 | Salter | ........................ 362/382 |
| 5,978,236 A | * | 11/1999 | Faberman et al. | ............. 363/37 |
| 6,504,423 B2 | * | 1/2003 | Riggio et al. | ............... 327/560 |
| 6,880,951 B2 | * | 4/2005 | Yoon | ........................... 362/206 |
| 7,108,397 B2 | * | 9/2006 | Wu | ......................... 362/249.05 |
| 7,410,273 B2 | * | 8/2008 | Lin | ........................ 362/296.07 |
| 7,714,348 B2 | * | 5/2010 | Fan et al. | ....................... 257/99 |

* cited by examiner

*Primary Examiner*—Haissa Philogene
(74) *Attorney, Agent, or Firm*—Chun-Ming Shih; HDLS IPR Services

(57) ABSTRACT

An LED lamp including at least one LED is electrically connected to a utility input voltage. A driving apparatus located inside a lamp holder of the LED lamp includes an input rectifying/filtering unit to accept the utility input voltage; an isolated power inverter electrically connected to the input rectifying/filtering unit to generate an buck A.C.; an output rectifying/filtering unit electrically connected to the isolated power inverter to generate an output D.C. voltage to drive the at least one LED. The components of the driving apparatus could be located inside the LED lamp, and the components can provide an isolation protection against the utility input voltage. The driving apparatus can more precisely control output D.C. voltage, current, and power as output D.C. voltage and current signals sent from the output rectifying/filtering unit are feedbacked to a photo coupler signal feedback unit.

9 Claims, 5 Drawing Sheets

LED LAMP AND DRIVING APPARATUS FOR THE SAME

BACKGROUND OF THE INVENTION

1. Field of the Invention

This invention generally relates to a LED lamp and its driving apparatus, and in more particular, relates to a LED lamp miniaturizing component size and providing isolation effect, and its driving apparatus.

2. Description of the Related Art

General lighting has an enormous effect in human activities and product property. Conventional general lighting includes incandescent lamp, fluorescent lamp and so on.

Since Edison improved the incandescent lamp in 1879, the incandescent lamp has been providing the low-price and convenient lighting source all the time. However, the incandescent lamp has drawbacks of low lighting efficiency, high power consumption, short life-time, heat-generating, and being easily broken. Particularly, global warming is a critical issue these days, and those drawbacks of the incandescent lamp are becoming more and more concerned by people. The fluorescent lamp is also the main device for providing indoor luminescence, and, however, still has problems of mercury contamination and high-voltage driven radiation.

The blue light LED based on GaN (Gallium Nitride) series blue light LED technology proposed by Nichia Corp., Japan, in 1996, excites YAG (yttrium aluminum garnet) phosphors to generate yellow fluorescence mixed with blue light to produce white light (blue light LED with YAG phosphors), and, therefore, the LEDs are henceforth stepping into the luminescence market.

The white light LED compared with the conventional incandescent lamp and fluorescent lamp has lots of advantages such as small physical size (lots of combinations), low heat-generating (reduced heat radiation), low power consumption (low voltage/current-initiated), long lifetime (more than 100,000 hours), quick response time (high frequency operation), environmental protection (enduring vibration, enduring impact without being broken, recyclable, and pollution-free), flat package, and being easily developed for light weight and small size products.

As the luminescence of the LED is improved and the LED cost downs is achieved, usages of the LED increases thereupon. Due to that the LED need to be D.C. voltage driven, if the LED wants to be applied to utility input (85Vac-264Vac) voltage usage, the corresponding driven circuits are essential.

FIG. 1 schematically illustrates a conventional LED drive circuit, wherein utility input voltage (85Vac-264Vac) is rectified and filtered into D.C. voltage to drive a resister being serially connected with several serial LEDs. For the LED drive circuit, the number of the several serial LEDs increases as many as possible to decrease the voltage drop and resistor power consumption between both ends of the resistor. However, in the LED drive circuit, as the voltage of utility input voltage slightly changes, the current through the serial LEDs would be affected and the luminescence is altered.

FIG. 2 schematically illustrates another conventional LED drive circuit, wherein utility input voltage (85Vac-264Vac) passes through a drive IC to provide a drive method of high voltage and steady current.

The LEDs for lamps are high power LEDs, and, frequently, the LEDs should be flatly mounted on a metal lamp cup of each lamp for heat dissipation. In the two above said conventional LED drive circuits, serial LEDs are directly connected with high voltage, and if the LEDs are still flatly mounted on the metal lamp cup of each lamp for heat dissipation, users might carelessly touch the metal lamp cup and thus directly electrically contact with the high voltage via the metal lamp cup.

FIG. 3 schematically illustrates still another conventional LED drive circuit, wherein the utility input voltage (85Vac-264Vac) is bucked via a front-end adapter to drive a drive IC to provide power for the serial LEDs. Even though the LEDs are still flatly mounted on the metal lamp cup of each lamp for heat dissipation, users would not electrically contact with the high voltage even carelessly touch the metal lamp cup. However, in this LED drive circuit, the front-end adapter could not be easily integrated and located into each lamp according to its size, and, as a result, the application and heat dissipation of this LED drive circuit are restricted.

SUMMARY OF THE INVENTION

The main purpose of the present invention is to provide a LED lamp miniaturizing component size and providing isolation effect and a driving apparatus for the same.

In order to achieve the above said purpose, the present invention provides a LED lamp including a driving apparatus, and the LED lamp including at least one LED is electrically connected to utility input voltage. The driving apparatus located inside a lamp holder of the LED lamp includes an input rectifying/filtering unit to receive the utility input voltage, an isolated power inverter electrically connected to the input rectifying/filtering unit to generate a buck A.C., and an output rectifying/filtering unit electrically connected to the isolated power inverter to generate an output D.C. voltage to drive the at least one LED. As components of the driving apparatus could be located inside the LED lamp, and the components can provide an isolation protection against the utility input voltage, thus, it is more advantageous to miniaturize the LED lamp and to increase the safety of the LED lamp. Furthermore, the driving apparatus can more precisely control output D.C. voltage, current, and power as the output D.C. voltage and current signals sent from the output rectifying/filtering unit are feedbacked to photo coupler signal feedback unit.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION FOR ILLUSTRATED EMBODIMENTS

Figure 1:
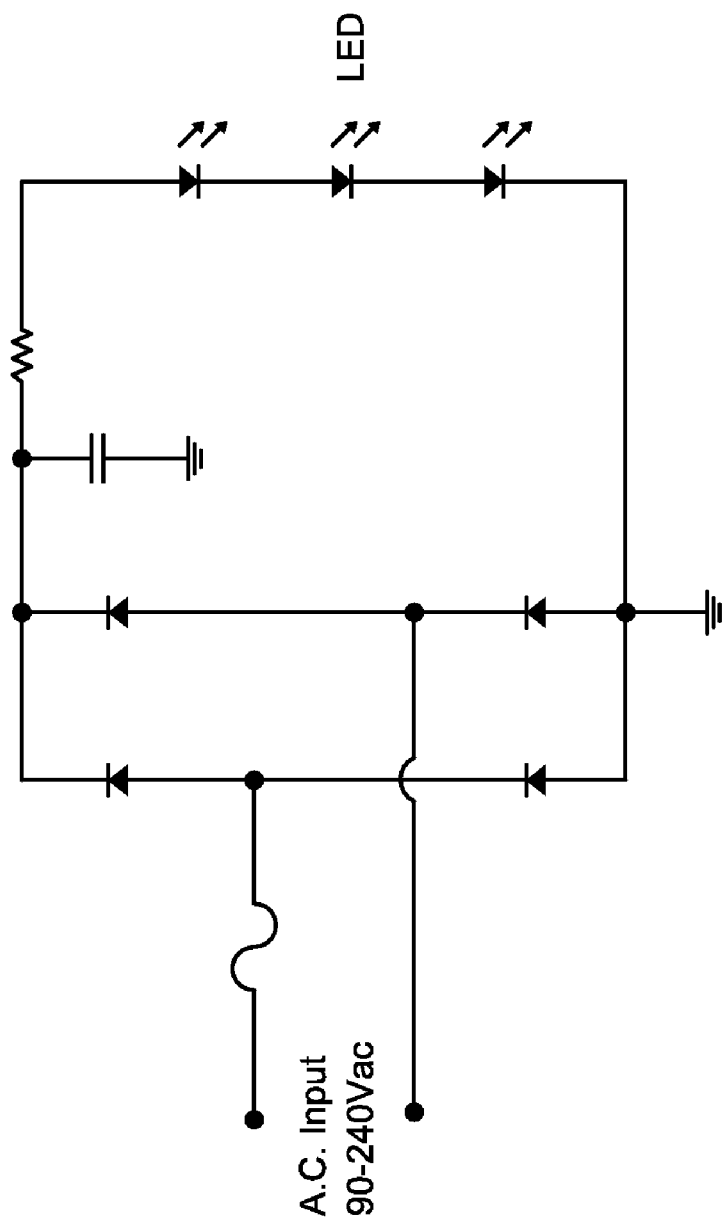
FIG. 1 schematically illustrates a conventional LED drive circuit.
Figure 2:
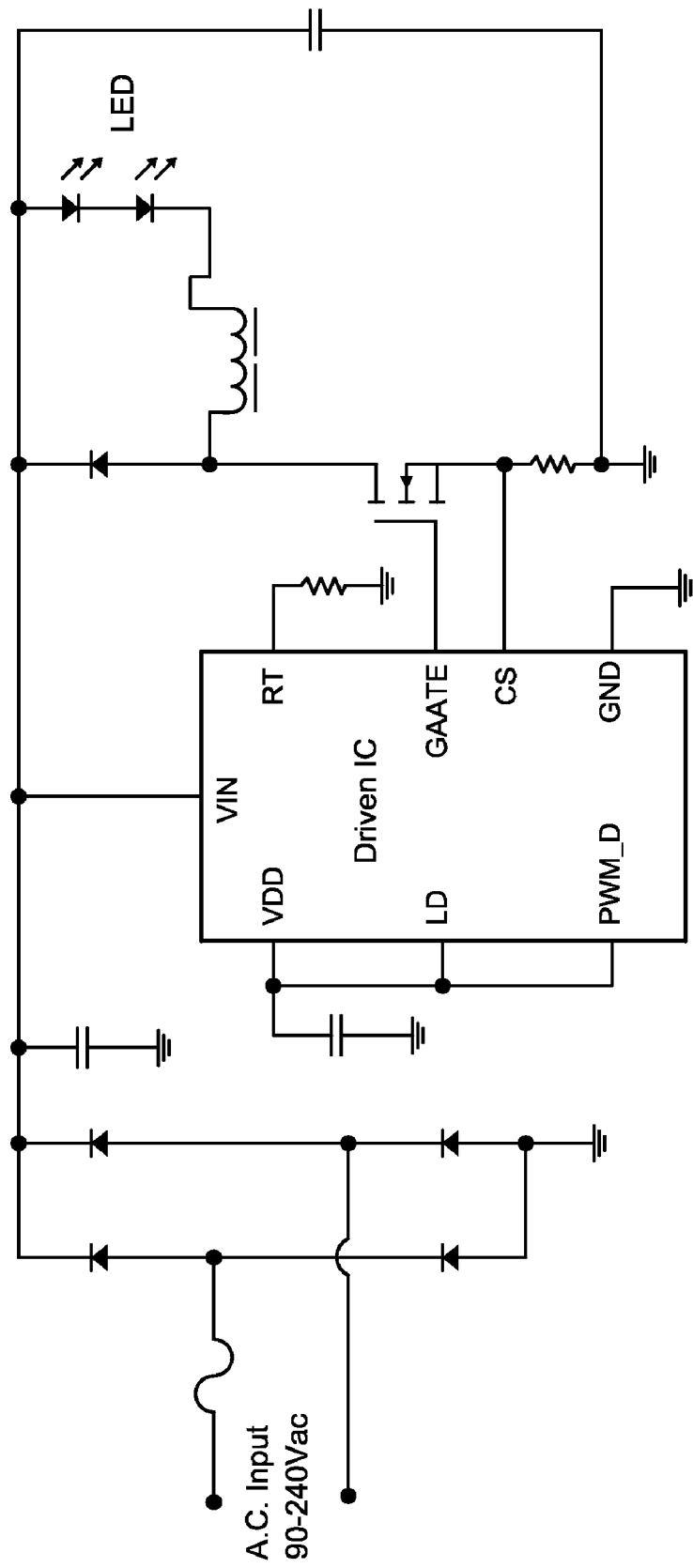
FIG. 2 schematically illustrates another conventional LED drive circuit.
Figure 3:
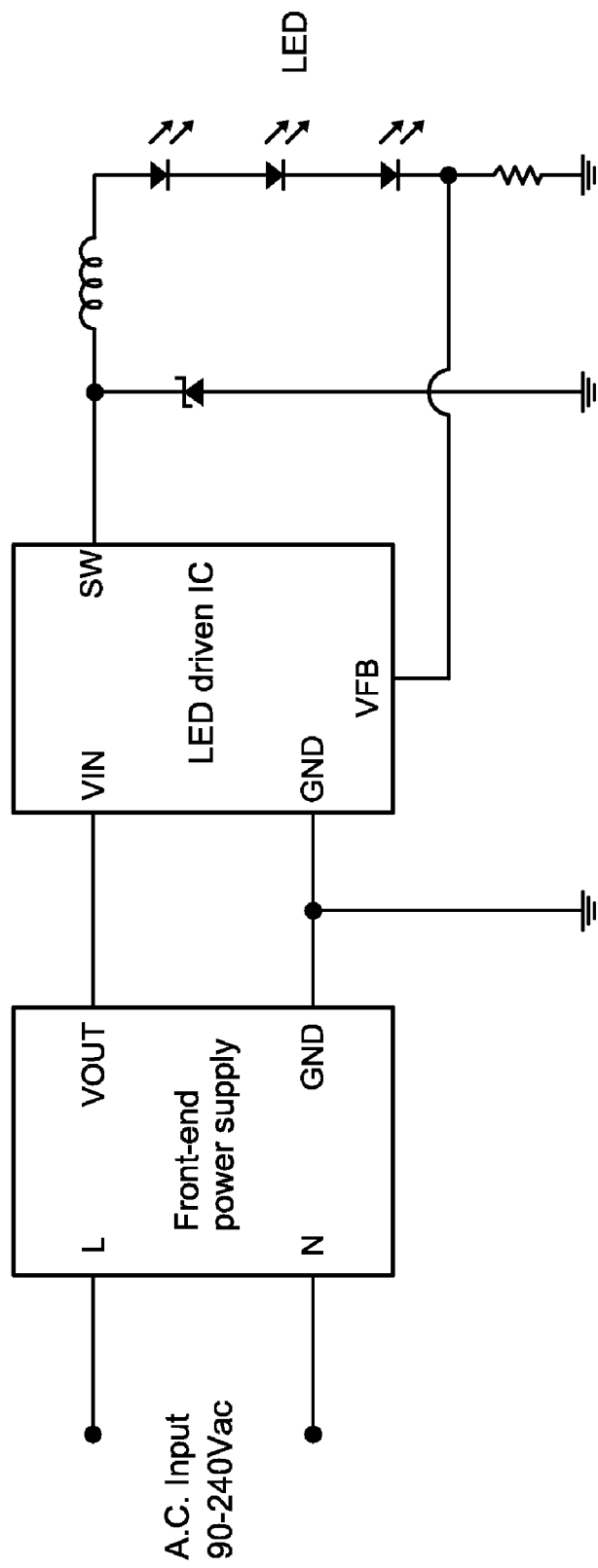
FIG. 3 schematically illustrates another conventional LED drive circuit.
Figure 4:
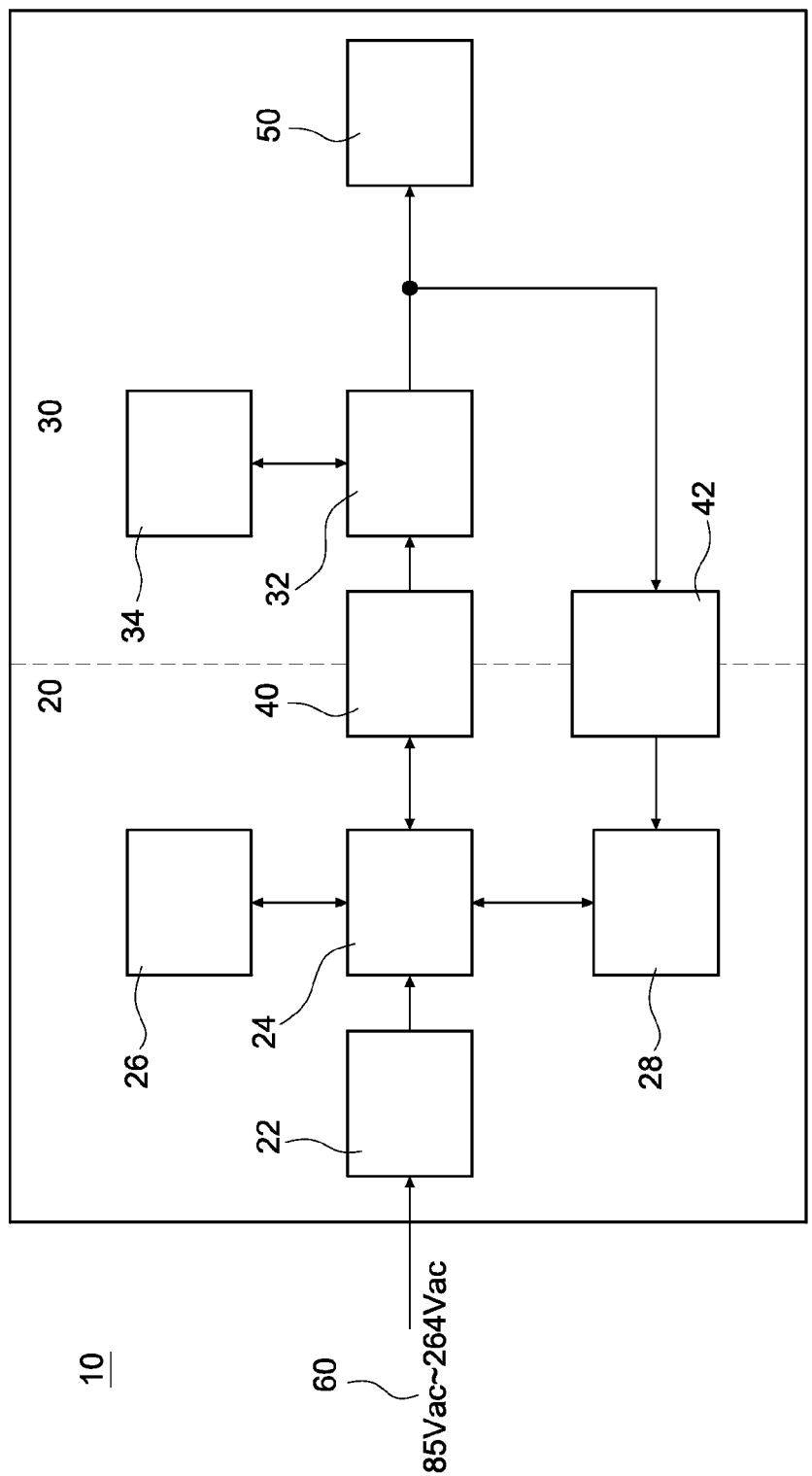
FIG. 4 schematically illustrates a preferred embodiment of the LED lamp driving apparatus according to the present invention.

FIG. 4 schematically illustrates a preferred embodiment of the LED lamp driving apparatus according to the present invention. As shown in FIG. 4, according to a preferred embodiment of the present invention, the driving apparatus 10 of the LED lamp receives an utility input voltage 60 (85Vac-264Vac), and drives at least one LED 50.

The driving apparatus 10 mainly includes a high voltage circuit block 20, a low voltage circuit block 30, an isolated power inverter 40 which is between and electrically connected to the high voltage circuit block 20 and the low voltage circuit block 30, and a photo coupler signal feedback unit 42. The high voltage circuit block 20 includes an EMI filter unit 22 electrically connected to the utility input voltage, an input rectifying/filtering unit 24, a voltage/current limiting unit 26, and a feedback and control unit 28. The low voltage circuit block 30 includes an output rectifying/filtering unit 32, and an output peripheral protection unit 34.

The EMI filter unit 22 is used to filter out high frequency EMI of the utility input voltage, and then to transmit the high A.C. voltage to the input rectifying/filtering unit 24 after filtering out the high frequency EMI. The input rectifying/filtering unit 24, for example, includes diode rectifier and capacitor filter circuit component to rectify the high A.C. voltage into high D.C. voltage. The voltage/current limiting unit 26 is electrically connected to the rectifying/filtering unit 24 to restrict output voltage/current upper limit of the input rectifying/filtering unit 24 for avoiding damaging the next-end isolated power inverter 40.

The isolated power inverter 40 has a built-in DC-to-AC converter (DAC) to transform an output D.C. voltage of the input rectifying/filtering unit 24 into an input A.C. voltage, and then to transform the input A.C. voltage into a lower level output A.C. voltage via a transformer circuit. First and secondary side isolation enduring pressure test of the isolated power inverter 40 fits lamps standard requests to provide more safety LED lamp products.

The output rectifying/filtering unit 32 receives an output A.C. voltage from the isolated power inverter 40, and transforms the output A.C. voltage into an output D.C. voltage. The output D.C. voltage provides steady voltage/current/power to at least one LED 50.

An input of the photo coupler signal feedback unit 42 is electrically connected to an output voltage of the output rectifying/filtering unit 32, and the photo coupler signal feedback unit 42 includes at least one set of a LED (not shown) and a transistor light receiver (not shown), and utilizes isolation way to feedback the corresponding output voltage and current signals of the output rectifying/filtering unit 32 to the feedback and control unit 28 of the high voltage circuit block 20.

The feedback and control unit 28 controls the input rectifying/filtering unit 24 according to the feedback signal. For example, when the utility input voltage 60 is unstable, the feedback and control unit 28 recognizes input voltage and current variations of the output rectifier and filter unit 32, and feedbacks the input voltage and current variations to the input rectifying/filtering unit 24 to control the output signal of the input rectifying/filtering unit 24 to make the driving apparatus 10 of the LED lamp have steady output. Furthermore, the output peripheral protection unit 34 can be set up to provide over-voltage, over-current, and over-temperature protections.

In the circuits shown in FIG. 4, the high voltage D.C. voltage of the input rectifying/filtering unit 24 can be transformed into high voltage A.C. voltage by the switch element (MOSFET)(not shown). The isolated power inverter 40 transforms the high A.C. voltage into low voltage A.C. voltage, and the low voltage A.C. voltage is transformed into D.C. voltage by the output rectifying/filtering unit 32. And wherein, the switch element can be located inside the feedback and control unit 28, the input rectifying/filtering unit 24, or the isolated power inverter 40.

Figure 5:
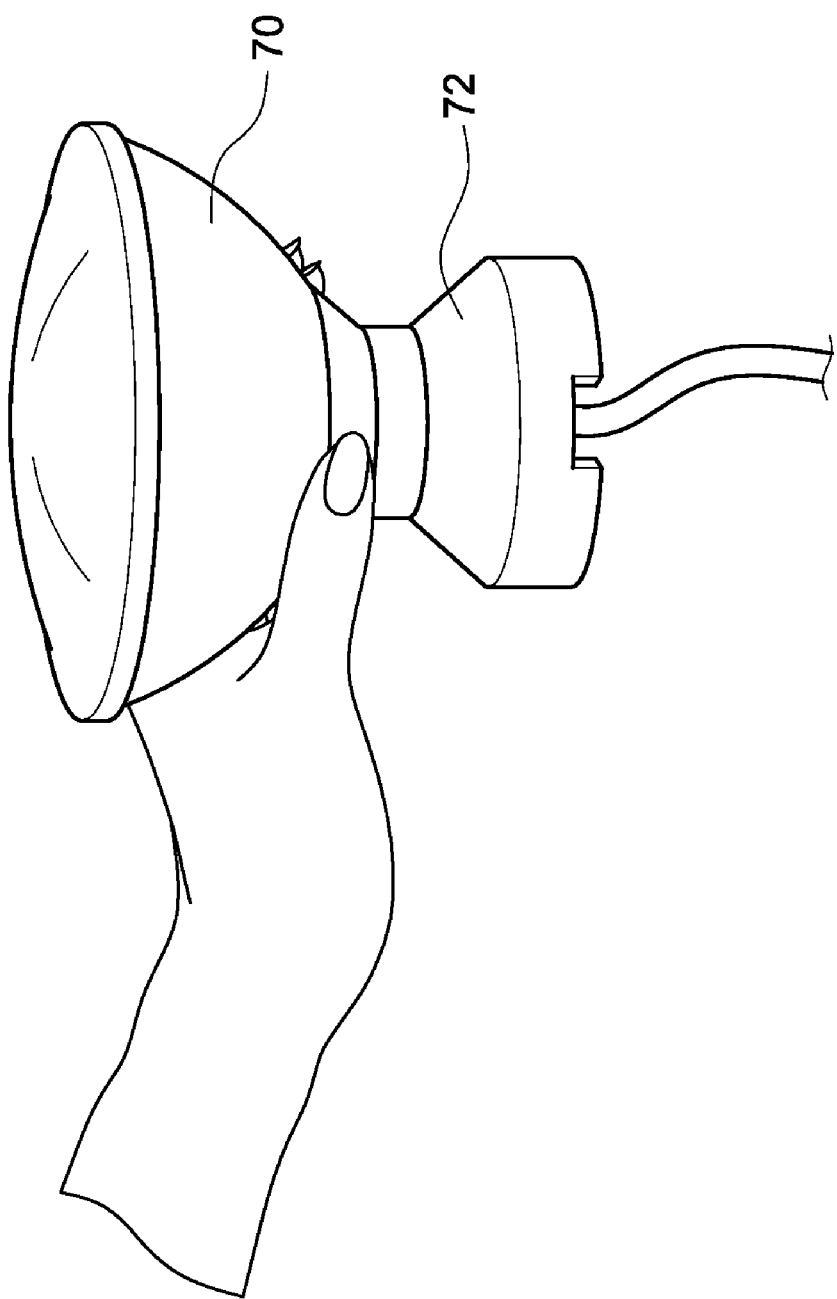
FIG. 5 schematically illustrates a preferred embodiment of the LED lamp according to the present invention.

FIG. 5 schematically illustrates an embodiment of the LED lamp of the present invention. Now referring to FIG. 5, the LED lamp includes a metal lamp cup 70, and a lamp holder 72, and the at least one LED 50 are thermally conductively connected to the metal lamp cup 70 to increase the heat dissipation; and, the LED lamp driving apparatus 10, for example, can be located inside the lamp holder 72 to transform the utility power source from the wall socket into D.C. voltage power source proper for the at least one LED 50.

According to that within the LED lamp driving apparatus 10, the high voltage circuit block 20 and the low voltage circuit block 30 are coupled together in an isolation way via the isolated power inverter 40 and the photo coupler signal feedback unit 42; and, thus, even that users touch the metal lamp cup 70, users would not electrically contact with electrical voltage. Furthermore, the efficiency of power transformation of circuit units of the LED lamp driving apparatus 10 of the present invention is more than 80%, and the LED lamp can be miniaturized. Therefore, it is advantageous to integrate and locate the driving apparatus 10 into the LED lamp, and to design kinds of LED lamps such as LED reading lamp or LED throw lamp for different purposes.

If the invention has been described hereinafter with reference to specific embodiment, numerous variations and alternative configurations will be apparent to the man skilled in the art. Accordingly it will be apparent to the man skilled in the art that such variations and alternative configurations are also embraced by the present invention and the scope of the invention is restricted only in accordance with the accompanying claims and equivalents thereof.

What is claimed is:

1. An LED lamp driving apparatus electrically connected between a utility input voltage and at least one LED, comprising:
   an input rectifying/filtering unit that receives the utility input voltage;
   an isolated power inverter that is electrically connected to the input rectifying/filtering unit to receive an output of the input rectifying/filtering unit to generate a buck A.C.;
   an output rectifying/filtering unit that is electrically connected to the isolated power inverter to receive the buck A.C. of the isolated power inverter and then to rectify and filter the buck A.C. into an output D.C. voltage; and
   a voltage/current limiting unit that is electrically connected to the input rectifying/filtering unit to restrict output voltage and output current of the input rectifying/filtering unit.

2. The LED lamp driving apparatus as claimed in claim 1, further comprising an EMI filter unit that is between and electrically connected to the utility input voltage and the input rectifying/filtering unit.

3. The LED lamp driving apparatus as claimed in claim 1, further comprising:
   a photo coupler signal feedback unit that is electrically connected to the output of the output rectifying/filtering unit; and
   a feedback and control unit that is electrically connected to the photo coupler signal feedback unit and the input rectifying/filtering unit, and uses the photo coupler signal feedback unit to feedback the output of the output rectifying/filtering unit to feedback and control the input rectifying/filtering unit.

4. The LED lamp driving apparatus as claimed in claim 1, wherein the input rectifying/filtering unit, the isolated power inverter, and the output rectifying/filtering unit are located inside a lamp holder of the LED lamp.

5. The LED lamp driving apparatus as claimed in claim 1, further comprising:
   an output peripheral protection unit that is electrically connected to the output rectifying/filtering unit to provide over-current, over-voltage, and over-temperature protections for the output rectifying/filtering unit.

6. An LED lamp receiving an utility input voltage, comprising:
   a metal lamp cup;
   a lamp holder that is connected to the metal lamp cup;
   at least one LED located inside the metal lamp cup; and
   a driving apparatus located inside the lamp holder, comprising:
      an input rectifying/filtering unit that receives the utility input voltage;
      an isolated power inverter that is electrically connected to the input rectifying/filtering unit to receive an output of the input rectifying/filtering unit to produce a buck A.C.; and
      a voltage/current limiting unit that is electrically connected to the input rectifying/filtering unit to restrict output voltage and output current of the input rectifying/filtering unit; and
      an output rectifying/filtering unit that is electrically connected to the isolated power inverter to receive the buck A.C. of the isolated power inverter and then to rectify and filter the buck A.C. into an output D.C. voltage to drive the at least one LED.

7. The LED lamp as claimed in claim 6, wherein the driving apparatus further comprises:
   an output peripheral protection unit that is electrically connected to the output rectifying/filtering unit to provide over-current, over-voltage, and over-temperature protections for the output rectifying/filtering unit.

8. The LED lamp as claimed in claim 7, wherein the driving apparatus further comprises an EMI filter unit that is electrically connected between and electrically connected to the utility input voltage and the input rectifying/filtering unit.

9. The LED lamp as claimed in claim 7, wherein the driving apparatus further comprises:
   at least one photo coupler signal feedback unit that is electrically connected to the output of the output rectifying/filtering unit; and
   a feedback and control unit that is electrically connected to the at least one photo coupler signal feedback unit and the input rectifying/filtering unit, and uses the at least one photo coupler signal feedback unit to feedback the output of the output rectifying/filtering unit to feedback and control the input rectifying/filtering unit.

\* \* \* \* \*